United States Patent [19]

van Rij et al.

[11] 4,137,605
[45] Feb. 6, 1979

[54] SEPARATION OF MEAT FROM BONES

[75] Inventors: Johannes D. van Rij, Zevenaar; Johannes W. Smits, Oss, both of Netherlands

[73] Assignee: Lever Brothers Company, New York, N.Y.

[21] Appl. No.: 815,775

[22] Filed: Jul. 14, 1977

[30] Foreign Application Priority Data

Jul. 14, 1976 [GB] United Kingdom ............... 29341/76

[51] Int. Cl.² .............................................. A22C 17/00
[52] U.S. Cl. .......................................... 17/46; 17/1 G
[58] Field of Search ............... 17/1 G, 1 R, 46; 83/51

[56] References Cited

U.S. PATENT DOCUMENTS

| 3,583,266 | 6/1971 | Kondo | 83/51 |
| 4,014,075 | 3/1977 | van Bergen | 17/1 G |
| 4,025,985 | 5/1977 | Rousseau | 17/1 G |

FOREIGN PATENT DOCUMENTS 1421886  1/1976  United Kingdom ...................... 17/1 G Primary Examiner—Donald R. Schran

[57] ABSTRACT

A method of removing meat from bone in which a portion of meat containing bone is subject to compression in a press along a longitudinal axis of the press, substantial pieces of the meat move laterally relative to said axis and to bone within said portion of meat and bone, the bone is gripped within the press, and bone-free structurally intact meat, which has moved laterally, is severed from the remaining bone and meat mass.

6 Claims, 6 Drawing Figures

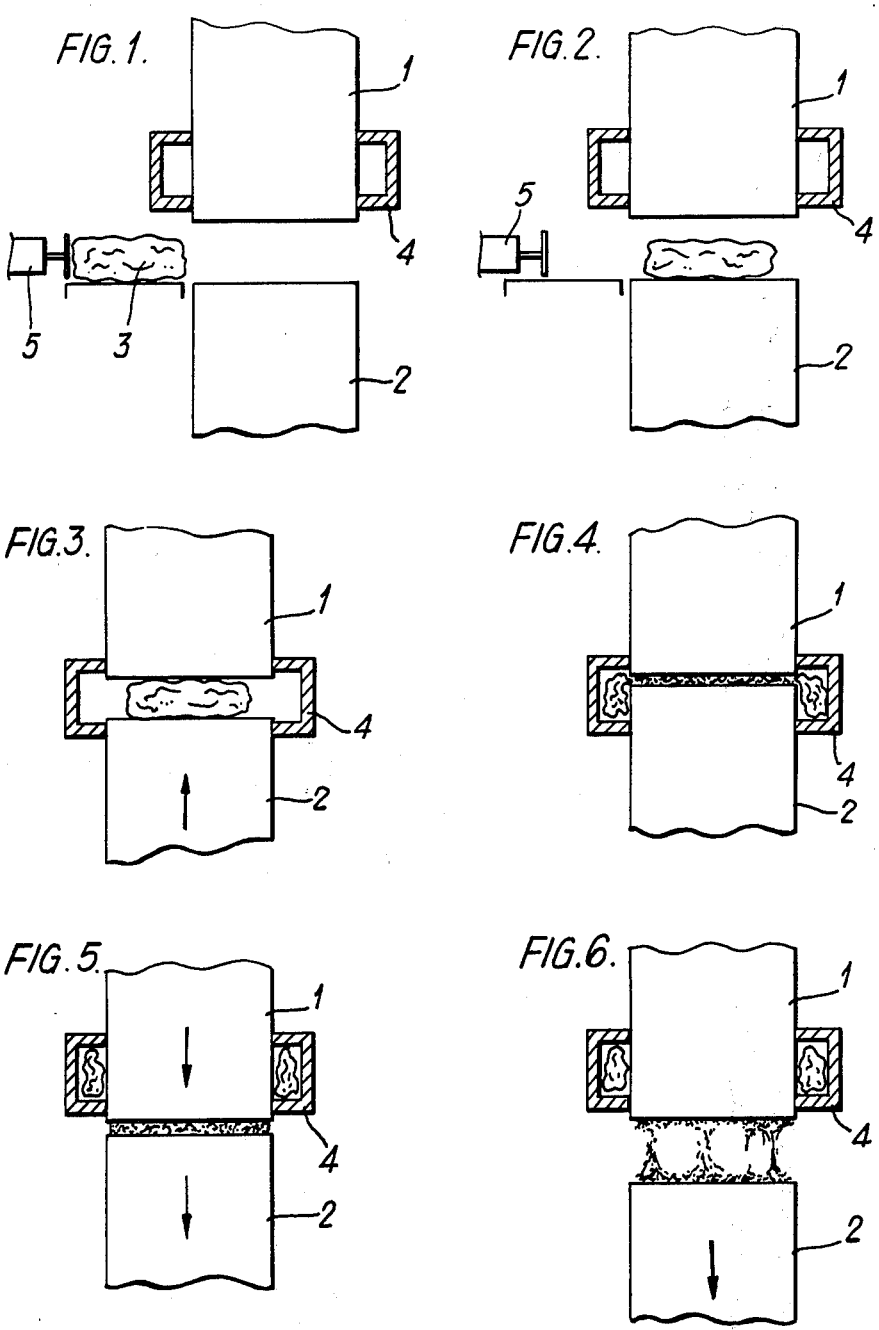

SEPARATION OF MEAT FROM BONES

The present invention relates to methods and apparatus for the separation of meat from bones.

Various methods are known for separating meat from bones by pressure. For example German Auslegeschrift No. 1 066 902 (Knorr) published 8 Oct. 1959 discloses a perforated cylinder in which bone and meat pieces are subject to high pressure so that the meat is forced through the perforations in the cylinder while the bone mass remains within the cylinder. More recently published Dutch Pat. application No. 7,404,032 discloses a system where the meat is forced through apertures at one end of the cylinder. In each case the meat which is removed from the system comes out as a puree with substantial destruction of the anatomical structure of the meat. This is because the meat needed to be forced through small holes, as it was thought essential that the bones should be restrained from lateral movement.

These particular known methods are well suited to the removal of meat from bone at a secondary stage, i.e. after an initial hand butchering operation has been effected where large chunks of meat are first removed from the carcass or bone by hand cutting or cleaving operations. Such meat is normally of a higher quality, and hence value, than meat obtained at a secondary stage in that the structure is intact rather than having been degraded by comminution.

The present invention is concerned with provision of a method and apparatus which is particularly suited to the first or primary stage of removal of the meat from the bone in that it aims to achieve relatively large pieces of bonefree meat with relatively little structural degradation.

Accordingly the invention provides a method of removing meat from bone in which a portion of meat containing bone is subject to compression in a press along a longitudinal axis of the press, substantial pieces of the meat move laterally relative to said axis and to bone within said portion of meat and bone, the bone is gripped within the press, and bone-free structually intact meat, which has moved laterally, is severed from the remaining bone and meat mass. The invention also provides an apparatus for deboning in this manner. Operation is based on the fact that the meat moves laterally relative to the bone during compression; and that subsequently the bone can be gripped as the pressing faces of the press come together. Thus there is no need to restrain the bone by use of a perforate wall.

The meat recovered by the method according to the present invention tends to be of higher quality than the prior art method since there has been less damage to the anatomical structure and it has not been subject to the inevitable comminuting action that takes place when passing meat through a perforate wall as in the prior art systems. By the term perforate we mean that the wall has holes or apertures which are so small that a comminuting or mincing action takes place and cell or muscular structure is destroyed. Such apertures are, in prior art systems, usually in the region of about 2 mm in at least one dimension.

Thus, according to the invention, deboning of primary meat cuts such as shoulders and hams can be achieved to yield good quality large pieces of bone-free meat. Moreover the mass of bone left within the system after removal of the pieces of bone-free meat usually still has some meat within it which can then be recovered by other methods such as in the prior art perforate wall bone presses.

In compressing the initial portion of meat containing bone, steps should be taken to collect the meat which is laterally separated from the bone. Thus one aspect of the present invention provides a bone press including a collector located laterally of and in open communication with a pressing zone in the press to catch the meat. This collector is preferably arranged to also act as a shear device for shearing the recovered meat from the remaining bone and meat mass within the press.

It should be noted that operation of the invention results in lateral movement of the meat relative to the bone. This can be explained as being due to the meat acting as a coherent mass which distorts in a somewhat elastic manner under pressure so as to move outwards relative to the centre of applied pressure. The bone, in being much harder, will not normally distort and move in this way, although it will be noted that discreet pieces of bones can move laterally when carried along by the moving meat mass at the edges of the press.

In many cases, particularly where the bone is centrally located, operation is straightforward. However when several pieces of bone are included in the meat and bone portion (e.g. a clump of rib bones), some of these pieces could move out of the press before being gripped by the pressing forces of the press. In practice this is no problem since the operator merely has to locate the meat so that such individual pieces of bone are not too close to the edge of the pressing forces, i.e. that the distance the pressing forces have to move together until the bone is gripped is less than the possible lateral movement of this bone out of the press. This becomes a question of firstly not selecting too large a piece of meat and bone for the particular press being used, and secondly ensuring that this piece - and particularly its bone - is located relatively centrally within the press.

An embodiment of the invention will now be described by way of example with reference to the diagrammatic drawings in which:

FIGS. 1 to 6 show sequentially the operation of a bone press in accordance with the invention.

Referring to FIG. 1 the apparatus comprises a top plunger 1 and a bottom plunger 2 which are arranged to approach one another to apply pressure to a portion of meat-containing bone 3. The two plungers may be circular or any other suitable profile in cross-section which ensures adequate cover of the kind of meat portion to be pressed, the main requirement being that the plunger is of an area to overlap the meat over the whole of its periphery.

Surrounding the upper plunger 1 is an annular collector 4. The annular collector 4 is a close fit to the cross-sectional periphery of the two plungers so that it can move relative to each of these as a shearing tool. Also provided is a feed piston 5.

In operation a piece of meat with a fairly centrally located piece of bone from which the meat is to be separated is fed into position between the two plungers (see FIGS. 1 and 2). The piece of meat has to have a cross-sectional area which is less than that of the plunger faces, more importantly the bone must be about 2 inches or 5 cm within the periphery of the plunger faces.

The two plungers then move upwards until the upper plunger 1 reaches a stop position and the lower plunger continues moving upwards to compress the meat. At this position the two plungers are then located so that the gap between them is totally enclosed within the annular collector 4 as shown in FIG. 3.

Further movement upwards of the lower plunger causes the bone within the portion 3 to be compressed under a gradually building up pressure of up to about 100 Kg/sq cm and gripped between the two plungers while meat is forced to flow laterally outwards into the meat collector 4. At this stage a compressed briquette of bone and meat puree remains gripped between the plungers while bone free meat flows laterally into the collector, and the two are still connected together by pieces of connective tissue.

The two plungers are then moved downwards together to the position shown in FIG. 5 and this causes the connective tissue to be sheared at the sliding contact zones between the collector 4 and the upper piston 5.

The lower plunger then moves further down so as to be back at the original FIG. 1 position and the bone and puree briquette is removed from between the plunger faces. The bone-free meat within the collector is subsequently removed.

The following trails were carried out using a press as described in the above embodiment having plunger diameters of 350 mm.

Tests and Results:-

| Trial 1:- | Derinded shoulder of pork (4½ - 5 Kg) | |
|---|---|---|
| Result :- | meat | 90 % |
| | bone cake | 10 % |
| | losses | 0.1 % |
| Remarks:- | There were still some small pieces of adhering bones in the meat. This was mainly because the shoulder was too big for the available press coverage of 350 mm diameter. A larger press has since been constructed with an increased coverage of 500 mm diameter to overcome this problem. | |
| Trial 2:- | Derinded heels of pork (1 piece at 700 gm) | |
| Result :- | meat | 55 % |
| | bone cake | 43 % |
| | losses | 2 % |
| Remarks:- | Good result with hardly any bone particle. | |
| Trial 3:- | Shoulder ribs of pork (2 pieces at 500 gm) | |
| Result :- | meat | 64 % |
| | bone cake | 34 % |
| | losses | 2 % |
| Remarks:- | analysis of | |
| | removed meat:- protein | 15 % |
| | fat | 26 % |
| | water | 58 % |
| | collagen | 7.5 % |
| | bone | 0.5 % |
| Trial 4:- | Tail bones of pork (3 tails at 250 gm) | |
| Result :- | meat | 52 % |
| | bone cake | 47 % |

Tests and Results:- -continued

| | |
|---|---|
| losses | 1 % |

Due to the size of the available press being restricted to 350 mm diameter, shoulders and ham had to be cut in two parts, and some small bone particles and pieces of bone adhering to the meat were found in the recovered meat. The quantity of this bone material however was small enough to be acceptable, and subsequently trails were carried out with a larger press having a diameter of 500 mm and less bone material was obtained in the recovered meat.

What is claimed is:

1. An apparatus for removing meat from bone comprising a compression press for compressing meat and bone along a longitudinal axis of the press, means for collecting the meat which moves laterally in consequence of said longitudinal compression, and means for severing structurally intact bone-free meat, which was moved laterally during compression, from a meat and bone mass which remains gripped within the press.

2. An apparatus according to claim 1 in which said collecting means is an annular chamber surrounding the press.

3. An apparatus according to claim 2 in which the annular chamber collecting means and the press together form a shear tool, movement between which causes severing of the bone-free meat from the gripped mass.

4. A method of removing meat from a portion of meat containing bone in a press, which comprises:
    (a) subjecting the portion of meat containing bone to such a compression between two movable plungers along a longitudinal axis of the press that substantial pieces of the meat move laterally relative to said axis and the bone within the portion of meat containing the bone;
    (b) gripping the bone between the two movable plungers within the press;
    (c) severing the bone-free, structurally intact meat, which has moved laterally, from the remaining, compressed bone-and-meat mass; and
    (d) subsequently removing the compressed mass from the press.

5. A method according to claim 4 including collecting the severed meat in an annular collecting chamber surrounding the press.

6. A method according to claim 4 in which the severing of the bone-free, structurally intact meat from the remaining, compressed bone-and-meat mass is effected by relative movement between the press and an annular collecting chamber closely fitting around the press, thus forming a shear tool together with the press.

* * * * *